Figure 1:
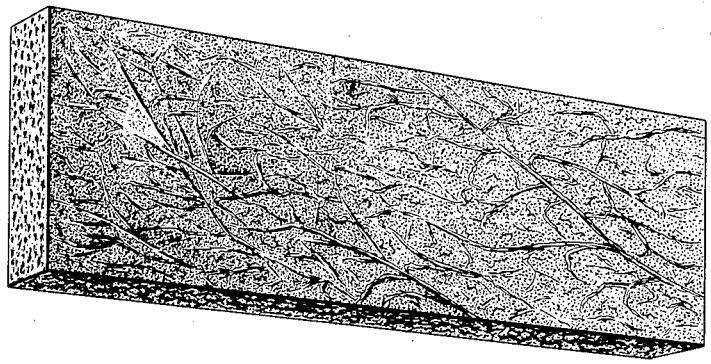

Dec. 27, 1932.  W. R. MEADOWS  1,892,659
EXPANSION JOINT FOR PAVEMENTS
Filed Nov. 1, 1926

Inventor:
William R. Meadows
By Jones, Addington, Ames & Seibold
Att'ys

Witness
Marvin H. Olsen.

Patented Dec. 27, 1932

1,892,659

UNITED STATES PATENT OFFICE

WILLIAM R. MEADOWS, OF ELGIN, ILLINOIS, ASSIGNOR TO CONSTRUCTION MATERIALS PATENTS, INC., OF LOCKLAND, OHIO, A CORPORATION OF OHIO

EXPANSION JOINT FOR PAVEMENTS

Application filed November 1, 1926. Serial No. 145,387.

My invention relates to mixtures of bituminous substances with binding materials or fibers, and it has particular relation to such a mixture formed into an expansion joint to be used between adjacent sections of paved roadways.

I have found that a non-cereal or hemp-like straw, particularly that representation of this class of materials which is known as slough grass or wire grass, or grass of like character, is of especial and unexpected efficiency when used as a binder in a bituminous or asphaltic expansion joint for roadways.

I have determined by experiment, among those elements which are available, that hemp-like material, and particularly slough grass, is quite different in its action when mixed with asphalt than any other material with which I am familiar. Other materials have been used in the past and are well known to the trade, but the efficiency of slough grass is marked in comparison with these other materials. This latter non-cereal straw is very tough and does not, therefore, break up into small pieces during the mixing of the straw and the asphalt. For this reason a joint incorporating such non-cereal, or slough grass, exhibits a marked ability to withstand the weather and rough usage to which these paving joints are subjected and also acts as a very good binder for the asphalt.

In my experiments I first, after a thorough investigation, fixed upon hemp, but as this material seemed too expensive for use in this connection, it was necessary to continue investigation along this line to locate a cheaper material. In the course of such investigation I determined that slough grass possessed the desired qualities, because it is a tough, wire-like fiber having exceptional lengths (3 to 6 inches) as compared with other binders (which break up to a maximum effective length of about one-half inch to one inch). Slough grass does not have as much stalk as other grasses and is, therefore, much cheaper since relatively more of the cut product can be used. This grass starts from a stalk but branches out into many long, fine wire-like branches. It is these branches that are used and which impart exceptional strength to my joint.

I have found that when such grass is thoroughly mixed and saturated with asphalt, the expansion joint formed from such mixture will hold the asphalt in the road, and since the holding and strengthening qualities of the slough grass are utilized in my joint this latter may be particularly relied upon.

In the accompanying drawing I have shown in perspective, cross-sectional elevation three joints formed in accordance with my invention, all of which embody the newly discovered and markedly efficient slough grass, or an analogous grass, binder.

In Figure 1, I have shown a joint in which slough grass only is incorporated with bituminous material.

The joint shown in this figure is about six inches in vertical dimension and about one-half inch thick and, as indicated in the drawing, the majority of the fibers run lengthwise, but because of their exceptional length curl around to encircle and bind together the asphalt in a very efficient manner. I find that slough grass fibers frequently run up to six inches or more in length, while excelsior or other straws are never over two inches in length and are usually less than one-half inch.

Broadly speaking my invention contemplates the incorporation of less than 50% of such grass with more than 50% of blown asphalt. It is somewhat difficult to illustrate in a two-dimensional drawing the manner in which the slough grass functions in a most efficient manner as a binder, but it may be observed that the form of this non-cereal straw is such as to insure a very tough binder having marked tensile strength.

Figure 2:
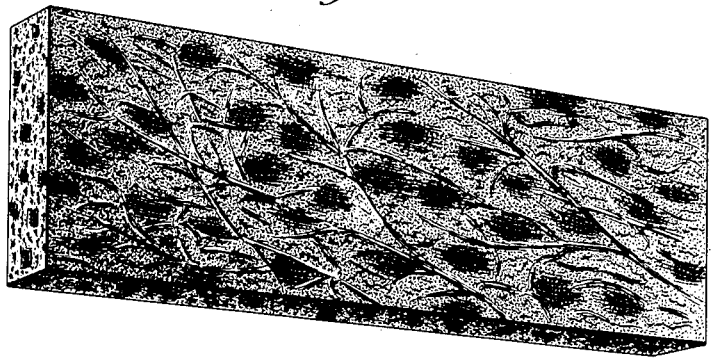

Figure 2 illustrates a joint in which a small amount of fine felt fiber has been incorporated.

The usual mixture in this joint is approximately 20% to 25% slough grass, 5% fine felt fiber, and 75% to 80% special blown asphalt. The slough grass acts as a binder with its long flexible fiber, while the felt acts as a filler and also strengthens the joint as a binder.

Figure 3:
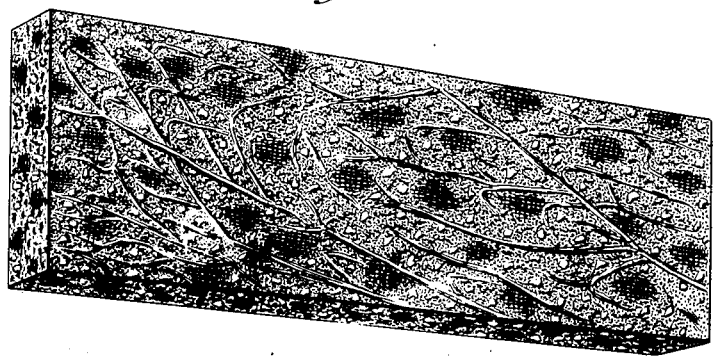

Still another mixture which I have utilized in connection with a joint embodying slough grass incorporates granulated cork, such a mixture being diagrammatically illustrated in Figure 3 wherein 5% to 15% of such cork is added to the mixture.

The mixtures above referred to are made into expansion joints as follows: The fiber is added to the molten asphalt while the latter is contained in large steam jacketed mixers; the asphalted fibers are mixed until the fiber is entirely incorporated in the asphalt, whereafter the mass is rolled out and formed into sheets. It is then passed upon a conveyor, whereafter it may be cut into strips of the proper width.

The manufacture of the above described mixture in which cork is incorporated with the fiber is particularly facilitated by the interaction of the long wiry fibers of the slough grass and the granulated cork. Normally it would be very difficult to incorporate granulated cork into a mixture of melted asphalt since the cork would float, and I find that no amount of agitating or mixing will properly incorporate the cork throughout the mass of asphalt. When, however, I manufacture an expansion joint embodying slough grass and cork, the latter is added last in order to prevent the undesired floating of the cork. In other words, the long wiry fibers of the slough grass are thoroughly admixed with the asphalt, whereafter the granulated cork is added. A further agitation of the mixture causes the fibrous, wiry grass to pull the cork into the mixture whereby said cork is desirably distributed throughout the mixture with advantageous effect upon the final product.

The small percentage of cork which is added tends to make the joint expand and contract in a much more marked degree than in any joint with which I am familiar. Cork has never heretofore been seriously advanced as a practical ingredient for an expansion joint; objection being had thereto on the ground that it was impossible to properly incorporate the cork throughout the structure of the joint. However, in using my novel method and product which involves placing the cork into the mixture after the slough grass has been thoroughly admixed with the asphalt gives such results as to permit the use of granulated cork. In other words, as above indicated, the fibrous material or wiry grass involves the cork and so pulls it into the mixture that the cork is properly distributed throughout a completed joint.

The particular combination above referred to and hereinafter claimed is of marked advantage from this standpoint, namely, that the manufacture of a joint embodying cork and slough grass thoroughly distributed throughout the asphalt body is possible.

Again, I find that a much more "rubbery" grade of asphalt can be used when slough grass is employed as a binder. This is an added advantage since it is desired that the joint be quite resilient, but heretofore it has been impossible to employ those grades of asphalt which are markedly resilient because they are too soft for practical use. With my particular invention it is possible to employ these soft grades of asphalt because of the surprisingly efficient action of slough grass which so binds the rubbery or soft asphalt together that a desirable joint may be preformed.

While I have described but one or two embodiments of my invention, it is to be understood that the properties of the non-cereal straw herein disclosed are of marked advantage, and that, therefore, materials which may be properly termed equivalents thereof are to be considered within the scope of this invention, and I desire therefore that the same be limited only by the showing of the prior art or by the scope of the appended claims.

I claim:

1. The method of manufacturing an expansion joint in which a material flotable in melted bituminous material is to be uniformly incorporated comprising first thoroughly mixing into said bituminous material a material capable of involving said flotable material, and thereafter adding said flotable material, which latter is involved and thoroughly distributed throughout the bituminous material.

2. The method of manufacturing an expansion joint in which cork is to be uniformly distributed throughout an asphaltic body which comprises first adding to said asphalt in melted condition a material capable of involving said cork, and thereafter adding said cork to the mixture, whereby said cork is involved and so drawn into the mixture upon further agitation thereof as to be distributed uniformly throughout said joint.

3. The method of manufacturing an expansion joint in which cork is to be uniformly distributed throughout an asphaltic body which comprises first adding to said asphalt in melted condition slough grass, or analogous material, and thereafter adding said cork to the mixture, whereby said cork is involved and so drawn into the mixture upon further agitation thereof as to be distributed uniformly throughout said joint.

4. A preformed expansion joint for use between adjacent sections of roadways embodying slough grass.

5. A preformed expansion joint for use between adjacent sections of roadways embodying approximately 25% slough grass and approximately 75% asphalt.

6. A preformed expansion joint for use between adjacent sections of roadways embodying approximately 20% to 25% slough grass, 5% felt fiber, and 75% to 80% blown asphalt.

In witness whereof, I have hereunto subscribed my name.

WILLIAM R. MEADOWS.